March 10, 1970 D. E. HAGGAN 3,500,229
MULTIMODE TRANSISTOR MULTIVIBRATOR
Filed Nov. 22, 1967
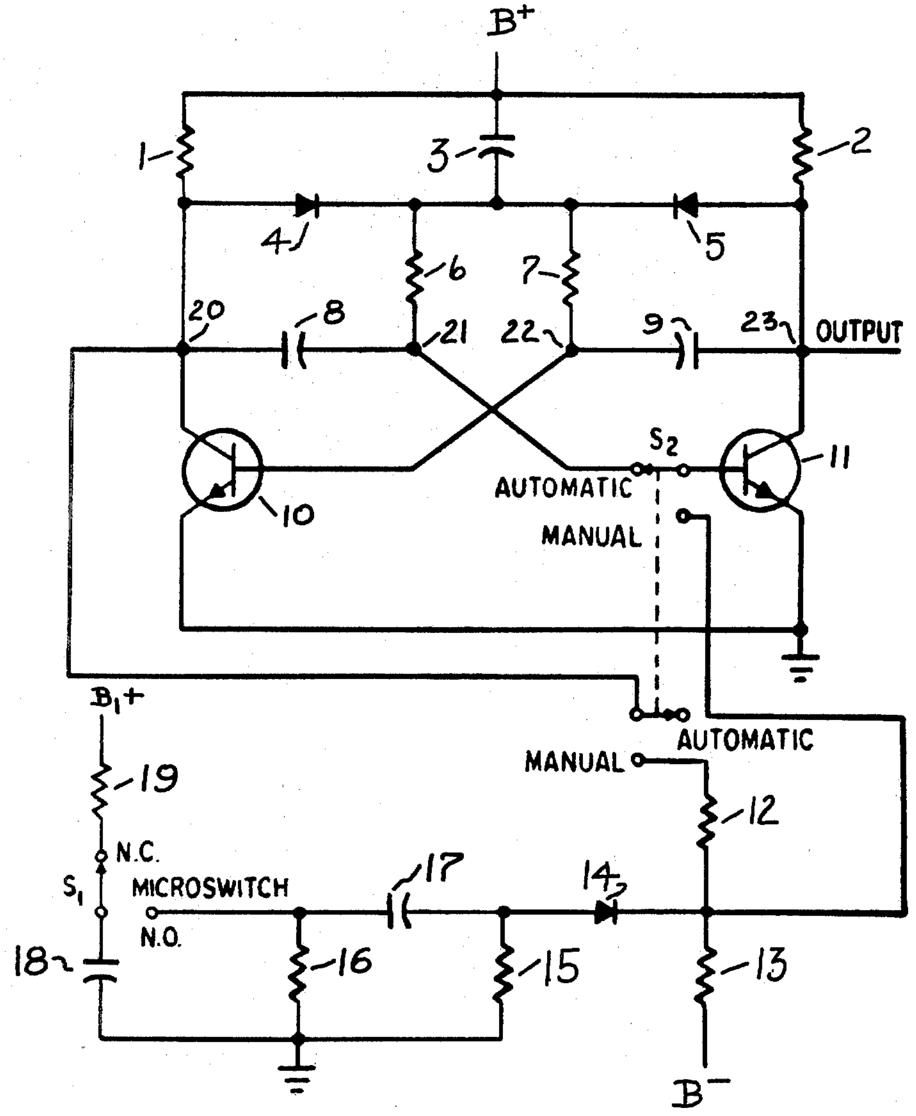
INVENTOR
DOUGLAS E. HAGGAN
BY Raymond B. Parker
ATTORNEY

United States Patent Office 3,500,229
Patented Mar. 10, 1970

3,500,229

MULTIMODE TRANSISTOR MULTIVIBRATOR

Douglas E. Haggan, Somerville, N.J., assignor to Burroughs Corporation, Detroit, Mich., a corporation of Michigan Filed Nov. 22, 1967, Ser. No. 685,084
Int. Cl. H03k 3/29, 3/282
U.S. Cl. 331—59 8 Claims

ABSTRACT OF THE DISCLOSURE

A two transistor circuit operates as either a monostable one-shot multivibrator or an astable multivibrator. In the monostable mode a source of pulses triggers the monostable multivibrator from its stable state to its astable state, and when the capacitor in the base circuit of the transistor charges sufficiently the multivibrator returns to its stable state to complete the cycle. By the addition of switch means to eliminate the source of pulses the multivibrator can also operate in the free-running or astable mode. By utilizing this invention various functions such as testing counter and logic circuits may now be performed both at high speed and manually at low speed without the necessity of building two test generators.

BACKGROUND OF THE INVENTION

Field of the invention

My invention relates generally to multivibrator circuits and more particularly to a convertible multivibrator circuit which includes means for readily converting the multivibrator from its monostable mode to its astable mode.

Description of the prior art

Multivibrators are well known and are very extensively used in various forms of electronic circuitry. Multivibrators fall into the category of signal or test generators used to test count and logic circuits that are designed to be switched between two voltage levels or conditions. The multivibrators may have two stable operating states, one stable operating state, or no stable operating state. The circuit that has two stable operating states is bistable; the circuit that has one stable state is monostable; and the circuit that has no stable state is astable (or free-running).

All three types of circuits may be actuated or triggered by an external signal or source of pulses. In the bistable mode of operation, an external pulse may be used to change the circuit from one stable state to the other stable state and so on. In the monostable mode of operation an external pulse may be used to switch the circuit from the stable state to the astable state but the circuit always returns, after a prescribed time interval, to the stable state. In the astable mode of operation with the circuit constantly switching from one astable state to another astable state a regular time intervals, external pulses may be used to synchronize the switching of the circuit to some function of the timing of the pulses from the external supply.

Presently known multivibrators include complementary cross-coupled like-conductivity transistors in combination with other symmetrically connected circuit components and arranged in a particular circuit configuration to provide either one-shot monostable switching action or free-running astable switching action. However, separate and distinct circuits are normally required for each type of multivibrator switching action and major modifications to individual circuit configurations, including taking the output from the various transistors for various modes of switching operation, are required.

SUMMARY OF THE INVENTION

The present invention has been designed to overcome the disadvantages in the requirement for separate circuits for each type of switching action required. The present invention includes means by which astable or monostable switching action may be achieved without the necessity of substantially modifying the circuit arrangement embodied by the present invention. This not only saves components which are usually necessary to initiate fast discharging of the multivibrator timing network, but also minimizes the physical size of the entire system, and permits the output to be obtained from the same transistor or pair of transistors for both modes of switching operation.

It is an object of the present invention to provide a new and improved multivibrator which may be easily converted between the monostable and astable modes of operation.

It is another object of the invention to provide a new and improved convertible multivibrator so that tests on counter circuits and logic circuits may be performed both manually and at high speeds by the same test generator.

It is a further object of the invention to provide a simplified convertible multivibrator by reducing the number of active elements.

BRIEF DESCRIPTION OF THE DRAWING

The novel features of this invention, as well as the invention itself, both as to its structure and method of operation, will be best understood from the following description, when read in connection with the accompanying drawing, in which:

The single figure of the drawing is a schematic representation of one embodiment of applicant's invention.

DETAILED DESCRIPTION OF THE PREFERRED EMBODIMENT

The description of the invention will be directed first to the astable or free-running mode of operation as seen in the figure when the switch S2 is in the automatic position. The second part of the description will discuss the operaton in the monostable mode when the switch S2 is in the manual position.

Referring to the drawing and with the switch in the automatic position, the illustrated circuit performs as a free-running multivibrator. The two transistors 10 and 11 may be either NPN or PNP type transistors. While in the illustrated embodiment NPN type transistors are shown, it should be realized that one skilled in the art could use PNP type transistors with the appropriate modification of the biasing and voltage sources, these modifications being well-known in the art. The two like-conductivity transistors are cross-coupled through capacitors 8 and 9 which are located between the collectors of the respective transistors and the base electrodes of the opposite transistors.

In the astable or free-running state the circuit operates conventionally causing each transistor to influence the other in switching from its conducting to non-conducting state. This operation is described herein for the purpose of making the description complete. Assuming for the purpose of this explanation that transistor 10 is in the conductive state and transistor 11 is in the non-conductive state the operation of the circuit would be as follows. Capacitor 8 would start to build up a charge from the source B+ through resistor 2, diode 5, and resistor 6. Since the emitter of transistor 10 is grounded and we are assuming the conductive state, the collector is also grounded and the left side of capacitor 8 designated point 20 (that point which is common to resistor 1, diode 4, capacitor 8 and the collector of transistor 10) is effectively at ground. From the voltage source B+ through resistor 2, diode 5, and resistor 6 a charge builds up on capacitor 8 with the right side of the capacitor 8, designated point 21 (that point which is common to resistor 6 and capacitor 8), positive with respect to the left side 20. The charging of the capacitor similarly places a positive voltage at the base of transistor 11 since the switch S2 is in the automatic position.

When the voltage at the base of transistor 11 reaches a level sufficient to overcome its emitter to collector voltage this transistor goes into the conductive state. Just prior to transistor 11 going into the conductive state, that is while it is still non-conducting, capacitor 9 has a charge which is positive to negative from right to left. Designating point 22 as that point which is common to resistor 7, capacitor 9 and the base of transistor 10, and designating point 23 as that point which is common to resistor 2, diode 5, capacitor 9, and the collector of transistor 11, then capacitor 9 has a charge wherein point 23 is positive with respect to point 22. As the charge builds up on the base of transistor 11 and the transistor goes into the conductive state, the potential on capacitor 9 discharges to the base of transistor 10. As transistor 11 goes into the conducting state the charge on the base of transistor 10 becomes sufficient to drive that transistor 10 to the non-conducting state. At this point a charge will start to build up on capacitor 9 with point 20 positive with respect to point 21.

This charge builds up as follows. Transistor 11 being conductive, the voltage from the collector to the emitter is effectively 0 (the emitter is grounded). From the voltage source B+ through resistor 1, diode 4, and resistor 7 voltage starts to build up on capacitor 9 with point 21 positive with respect to point 20. Similarly this relatively positive voltage is applied to the base of transistor 10 and tends to drive transistor 10 back to the conducting state. Resistors 1 and 2 with voltage source B+ serve to bias diodes 4 and 5 in the conventional manner. Capacitor 3 is effectively an open circuit with respect to the source B+.

As a result of this astable mode of operation the output for testing counter and logic circuits at high speed appears at the collector of transistor 11. It will be noted in the following description of the monostable mode of operation that the output for low speed testing also appears at the collector of transistor 11.

With the circuit operating in this astable manner, the output form point 23 may be utilized for testing counter and logic circuits at high switching speeds. Similarly outputs from 20 or both 20 and 23 could be taken and used in a like manner. When the circuit operates as an astable multivibrator the pulses are of a duration of approximately 1.5 microseconds and the repetition rate is 150 kilohertz.

When it becomes desirable to utilize the illustrated circuit as a one-shot monostable multivibrator, the circuit components shown in the lower part of the figure are coupled to the transistors 10 and 11. There is no need to modify the circuit by the addition of active elements as in the prior art or by taking the multivibrator output from a different active element as also found in the prior art, the output from point 23 will now represent the output in the monostable mode of operation. This is a significant improvement over the prior art when it was necessary to utilize different pairs of transistors for different modes of operation.

Transistor 10 is biased positively by the supply B+ through resistor 2, diode 5, and resistor 7. Initially, therefore, the circuit rests in a stable state with transistor 10 conducting saturation current and transistor 11 cut-off. By opening one cross-coupling path and inserting therein the circuit illustrated in the lower portion of the figure the base of transistor 11 is negative biased through voltage source B− and resistor 13. This negative bias assures that transistor 11 is non-conducting. The collector of transistor 10 has a negative potential applied through resistors 12 and 13.

Switch S1, which may be a microswitch or any other switch which has normally open and normally closed positions, (spring loaded to the normally closed position) operates to overcome the negative voltage B− to the base of transistor 11 and shift transistor 11 into the on or conducting state. With the switch S1 in the normally closed (N.C.) position the voltage from B1+, which is equal in magnitude to B+, is applied through resistor 19 and capacitor 18 to ground. When it is desired to get a testing (triggering) pulse from the monostable multivibrator the operator activates the microswitch. The microswitch goes to the normally open (N.O.) position and the charge which had built up on capacitor 18 is applied through coupling capacitor 17 and diode 14 to the base of transistor 11. This positive triggering pulse is of sufficient amplitude to overcome the negative bias (supplied by B−) and will forward bias transistor 11 and cause it to conduct. Conduction of transistor 11, due to the positive triggering pulse, initiates an abrupt transition to the astable state. With transistor 10 now cut off, and transistor 11 conducting saturation current, the circuit rests in its quasi-stable (astable) state. During this period, capacitor 9 discharges toward the low collector potential of transistor 11. The discharge current of capacitor 9 biases transistor 10 negatively, well below cut off level of the transistor. Transistor 10 remains cut off until the negative potential at the base of transistor 10 decreases to the conduction level of the transistor. When transistor 10 conducts, an abrupt switching action again occurs and the initial stable state is re-established. The transistor monostable multivibrator may be triggered by a positive pulse at the base of transistor 11 or by a neagtive pulse at the base of transistor 10. It is noted that the output of transistor 11 taken between point 23 and ground provides the necessary testing pulse for low speed manual testing, and this is the identical source of the output for high speed automatic testing as described hereinbefore.

The process of opening one of the cross-coupling paths and inserting those circuit elements necessary for monostable operation may be readily accomplished by a two-pole double-throw switch S2. This switch is to be in the automatic position (as seen in the figure) during the astable mode of operation, and in the manual position during the monostable mode of operation. This permits the use of the same pair of transistors in both monostable and astable modes of operation. Throwing switch S2 to the manual position operates to open the cross-coupled path to the base of transistor 11, and connects part of the circuit thereto, as seen in the figure. Simultaneously the other part of S2 operates to complete the circuit and apply a negative voltage B− to the collector of transistor 10.

In one embodiment of the invention circuit parameters found satisfactory were as follows:

| | | |
|---|---|---|
| Transistors: | | |
| **10** and **11** | | 2N3646 |
| Diodes: | | |
| **4**, **5** and **14** | | 1N914 |
| Capacitors: | | |
| **3** and **18** | microfarads | 0.1 |
| **17** | picofarads | 100 |
| **8** and **9** | do | 380 |
| Resistors: | | |
| **1**, **2** and **15** | kilohms | 1.0 |
| **6** and **7** | do | 22 |
| **12** and **16** | do | 10 |
| **13** | do | 47 |
| **19** | do | 100 |
| Sources: | | |
| B− | volts | −10 |
| B+ and B1+ | do | 10 |

While the invention has been described and illustrated with reference to a specific embodiment thereof, it will be understood that other embodiments may be resorted to without departing from the invention. Therefore, the form of inventions set out above should be considered as illustrative and not as limiting the scope of the following claims.

I claim:

1. A convertible transistor multivibrator circuit comprising:
   first and second like-conductivity transistors,
   means for connecting said transistors for providing astable multivibrator operation,
      said connecting means including cross-coupling paths from the base of each transistor to the collector of the other transistor,
   means for supplying triggering pulses,
   means for biasing one of said transistors into nonconduction, and
   means for opening one of said cross-coupling paths and for connecting said supplying means and said biasing means to said transistors, across said opened cross-coupling path, for providing monostable multivibrator operation.

2. The circuit of claim 1 wherein said means for opening and connecting is a switch.

3. The circuit of claim 2 wherein said switch is a two-pole double-throw switch.

4. The circuit of claim 1 whereby the output during said astable operation and the output during said monostable operation is provided by one of said transistors.

5. The circuit of claim 1 wherein said biasing means provides a constant level output whereby said circuit operates in the stable condition of said monostable multivibrator operation when said biasing means is connected to said transistors.

6. The circuit of claim 1 wherein said supplying means includes a capacitor and means to charge said capacitor.

7. The circuit of claim 6 wherein said triggering means further includes means to discharge said capacitor whereby said circuit operates in the quasi-stable condition of said monostable multivibrator operation when said triggering means is operatively connected to said transistors.

8. The circuit of claim 7 wherein said triggering means further includes switch means selectively operable to permit the charging and discharging of said capacitor.

References Cited

UNITED STATES PATENTS

| | | | |
|---|---|---|---|
| 2,757,286 | 7/1956 | Wanlass | 331—113 |
| 2,838,675 | 6/1958 | Wanlass | 331—145 |
| 2,888,579 | 5/1959 | Wanlass | 331—113 |
| 2,888,580 | 5/1959 | Wanlass | 331—113 |
| 2,900,502 | 8/1959 | Kuehn et al. | 331—145 |
| 3,008,088 | 11/1961 | Beeler | 328—207 |
| 3,331,032 | 7/1967 | Miller | 331—113 |

OTHER REFERENCES

Ferrie, Electronics, p. 78, May 4, 1964.

JOHN KOMINSKI, Primary Examiner

U.S. Cl. X.R.

331—113